(12) United States Patent
Altwies et al.

(10) Patent No.: US 7,865,443 B1
(45) Date of Patent: Jan. 4, 2011

(54) METHOD AND SYSTEM FOR ELECTRONIC DATA SALES AND DISTRIBUTION OVER WIDE AREA NETWORKS

(75) Inventors: Tony Altwies, San Jose, CA (US); Raymond Chock, San Jose, CA (US)

(73) Assignee: IXYS CH GmbH (CH)

( * ) Notice: Subject to any disclaimer, the term of this patent is extended or adjusted under 35 U.S.C. 154(b) by 2477 days.

(21) Appl. No.: 09/654,858

(22) Filed: Sep. 5, 2000

(51) Int. Cl.
*G06F 17/00* (2006.01)
(52) U.S. Cl. .................... 705/59; 726/26; 705/50
(58) Field of Classification Search ............ 705/59, 705/54, 55; 713/15; 726/26
See application file for complete search history.

(56) References Cited

U.S. PATENT DOCUMENTS

| 5,925,127 A * | 7/1999 | Ahmad ................ 713/200 |
| 6,073,124 A * | 6/2000 | Krishnan et al. ........... 705/59 |
| 6,108,779 A * | 8/2000 | Dean et al. ................ 713/2 |
| 6,343,280 B2 * | 1/2002 | Clark ..................... 705/55 |
| 6,460,023 B1 * | 10/2002 | Bean et al. ............... 705/54 |
| 2001/0011254 A1 * | 8/2001 | Clark ..................... 705/59 |
| 2001/0011341 A1 * | 8/2001 | Hayes, Jr. et al. .......... 712/11 |
| 2002/0032763 A1 * | 3/2002 | Cox et al. ................ 709/223 |
| 2002/0102809 A1 * | 8/2002 | Barth et al. ............... 438/393 |
| 2002/0138441 A1 * | 9/2002 | Lopatic .................. 705/59 |

FOREIGN PATENT DOCUMENTS

WO    WO 00/75787 A1 * 12/2000

* cited by examiner

*Primary Examiner*—Calvin L Hewitt, II
*Assistant Examiner*—John M Winter
(74) *Attorney, Agent, or Firm*—Imperium Patent Works; Darien K. Wallace

(57) ABSTRACT

An Improved Method and System for Electronic Data Sales and Distribution over Wide Area Networks is disclosed. The preferred system and method divides the software or other data to be distributed into a separate licensing module and a program module, with each module being distributed separately. The preferred licensing module can be distributed by an e-commerce server over a wide-area network, while the program module is distributed by a separate server computer over the wide-area network (or other method). Furthermore, the software or other electronic data can be updated easily by simply updating the single repository of the program module, while leaving the licensing module(s) at each e-commerce server unchanged.

19 Claims, 10 Drawing Sheets

METHOD AND SYSTEM FOR ELECTRONIC DATA SALES AND DISTRIBUTION OVER WIDE AREA NETWORKS

BACKGROUND OF THE INVENTION

1. Field of the Invention

This invention relates generally to electronic commerce and, more specifically, to an Improved Method and System for Electronic Data Sales and Distribution over Wide Area Computer Networks

2. Description of Related Art

Software sales over wide area networks and in particular, the World Wide Network have expanded rapidly to the extent that today a large portion of all software sales are conducted over the World Wide Web. There are however, several problems due to the conventional arrangement of these e-commerce systems. If we first turn to FIG. 1, we can begin to understand how conventional sale of software over the World Wide Web is accomplished.

FIG. 1 depicts conventional wide area network based e-commerce layout. As we can see, Wide Area Network Conduits 10 (typically known as the World Wide Web) has an infinite number of participants. Some examples as it might apply to the present invention will include a Wide Area Network Serve (for example 12A, 12B, and 12C) where e-commerce service supplier presents the environment for which a customer can purchase the suppliers software. Within each server 12, resides the Software Distribution Points 14A, 14B, and 14C within which the actual master copies of the suppliers software resides. Each supplier has the ability to modify or otherwise access the Distribution Points 14 via the Supplier Terminal 16. Typically new or revised copies of the software are to distributed or housed on the supplier site in their Local Area Network Server 18. Customers then, have the ability to "visit" a particular e-commerce site via their own Personal Terminal 20. If we now turn to FIG. 2, we can examine how the supplier might post their software product at each Server 12 for distribution to customers.

FIG. 2 describes the conventional supplier posting process for a software supplier to establish and maintain wide area network based software sale. At the conclusions of these Supplier Development Process 200, includes both new software development as wells as releases of revised, improved, or corrected software. And for each Software Release 202, a series of steps must occur. First, the software or revision is developed for sale 204, then for each e-commerce service provider 206, the software must be personalized so that it complies with the format and licensing requirements of each e-commerce site 208. After which, the e-commerce site compliant software is uploaded to a particular e-commerce site 210. In which steps 208 and 210 must be re-executed off each e-commerce supplier. Once all e-commerce suppliers have had an upload 212, then the new release process has been completed 214 and the customers are able to purchase the particular software revision 216. The problem with this conventional posting process is that for each software release, not only does new software have to be completed and tested, but also for each difference between each supplier mandates that the software supplier must again revise and upload the software potentially several more times prior to the customer being able to purchase it from all the e-commerce service providers. The multitude of revisions and uploads can create a huge amount of work for the software supplier, particularly when new additions or corrections are created. What is needed is a software supplier posting process that minimizes the number of revisions and uploads that the supplier must conduct in order to have widespread e-commerce outlets for customers to purchase their software. If we now turn to FIG. 3, we can examine conventional customer e-commerce software purchase process 216.

FIG. 3 is a conventional customer e-commerce software purchase process. It can be understood that each e-commerce supplier may decide to employ a different configuration. For example, the e-commerce supplier 12A may first require the customer to download their software from their server 300. After which, the customer must run what is conventionally know as a setup.exe program 302 in which the software will function 304 and only for a limited time. This is known as a try before you buy software purchase. At anytime before or after the end of the try before you buy period, the customer may chose to purchase the software 306 after which they are provided with a key code by the e-commerce supplier. For example, 12A that is entered into the software 308 after which the software functions without limitation. In another e-commerce site 12B, for example, a different method for purchase may exist. When the customer purchases the software 310, they then download the software from the supplier 12B, 312 and then run the setup.exe file 314. The difference here, is that prior to the customer downloading the software 312, the purchase must be conducted. As can be appreciated, the process provided by supplier 12A will create a totally different environment and a different software package then that software provided by the process of supplier 12B. Furthermore, supplier 12C might engage in yet another version of the purchase process. The problem with these prior processes, is that the interface to the customer is inconsistent and depending upon which e-commerce site they visit, they will experience a different purchase process. What is needed, is a way for the supplier of software to determine what the customers purchase process will be while still maintaining the necessary security requirements. To review, if we now turn to FIG. 4, we can see that the customer from their terminal 20 buys software by making a payment 400 to the e-commerce server 12 after which the software is downloaded 402 from the e-commerce server 12 to the customer terminal 20.

FIG. 4 depicts the conventional relationships between the customer, the e-commerce, the service provider, and the software supplier. Any updates or new releases to the software 404 originate from the supplier terminal 16 and are uploaded to the e-commerce server 12. Furthermore, when sales are made, the records and payments are transmitted form the e-commerce supplier 12 to the supplier terminal 16. If we now turn to FIG. 5, we can see that surprisingly the conventional software application 500 is represented by this depiction of a storage media as a single discrete package 500.

SUMMARY OF THE INVENTION

In light of the aforementioned problems associated with the prior methods and systems, it is an object of the present invention to provide an Improved Method and System for Electronic Data Sales and Distribution over Wide Area Networks. It is another object that the system and method divide the software or other data to be distributed into a licensing module and a program module, with each module being distributed separately. It is a further object that the licensing module be distributed by an e-commerce server over a wide-area network, while the program module is distributed by a separate server computer over the wide-area network. It is yet another object that software or other electronic data can be updated easily by simply updating the single repository of the program module, while leaving the licensing module(s) at each e-commerce server unchanged.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an Improved Method and System for Software Sales and Distribution over Wide Area Networks.

Figure 1:
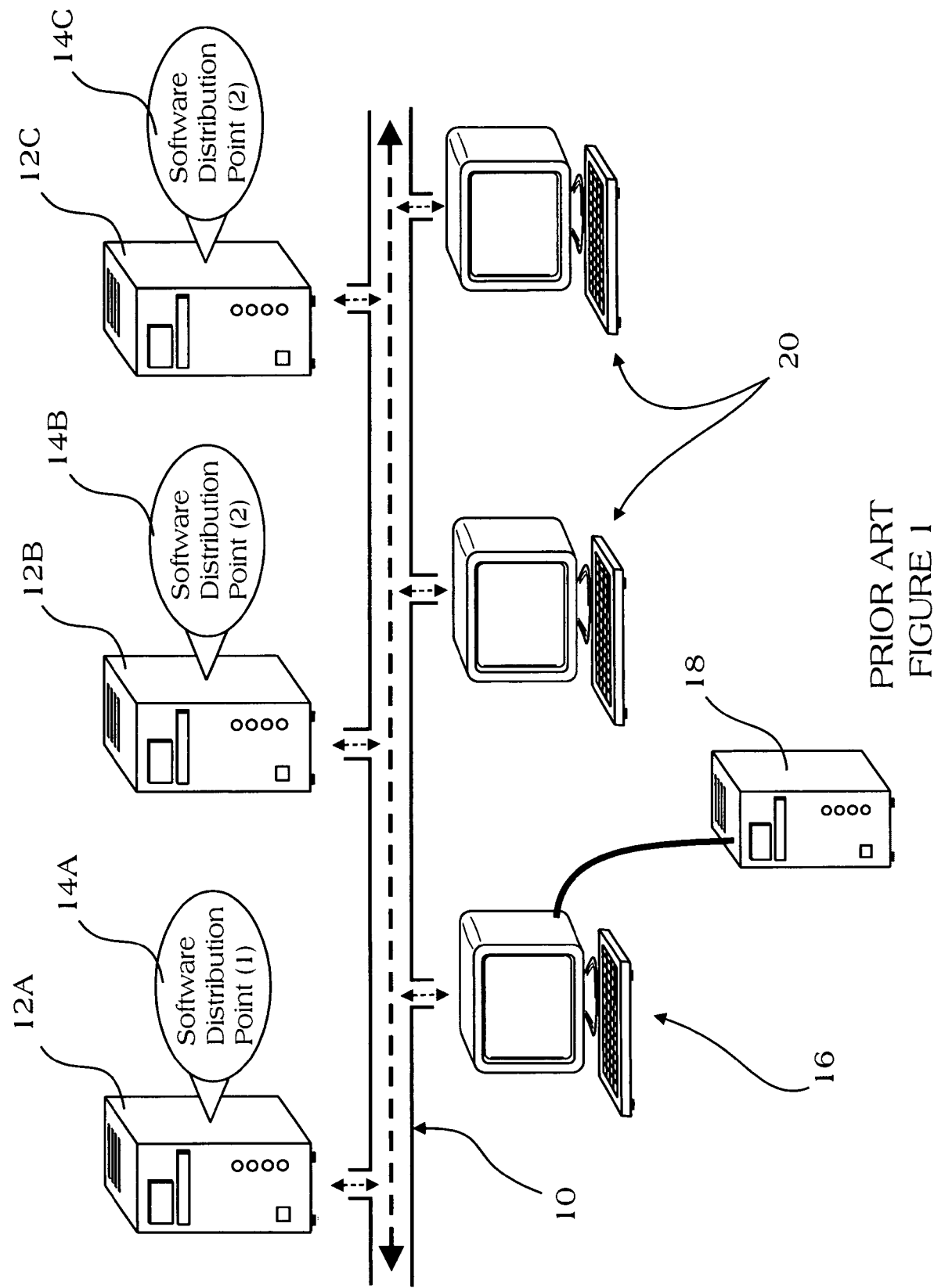
FIG. 1 depicts conventional wide area network based e-commerce layout of the prior art.
Figure 2:
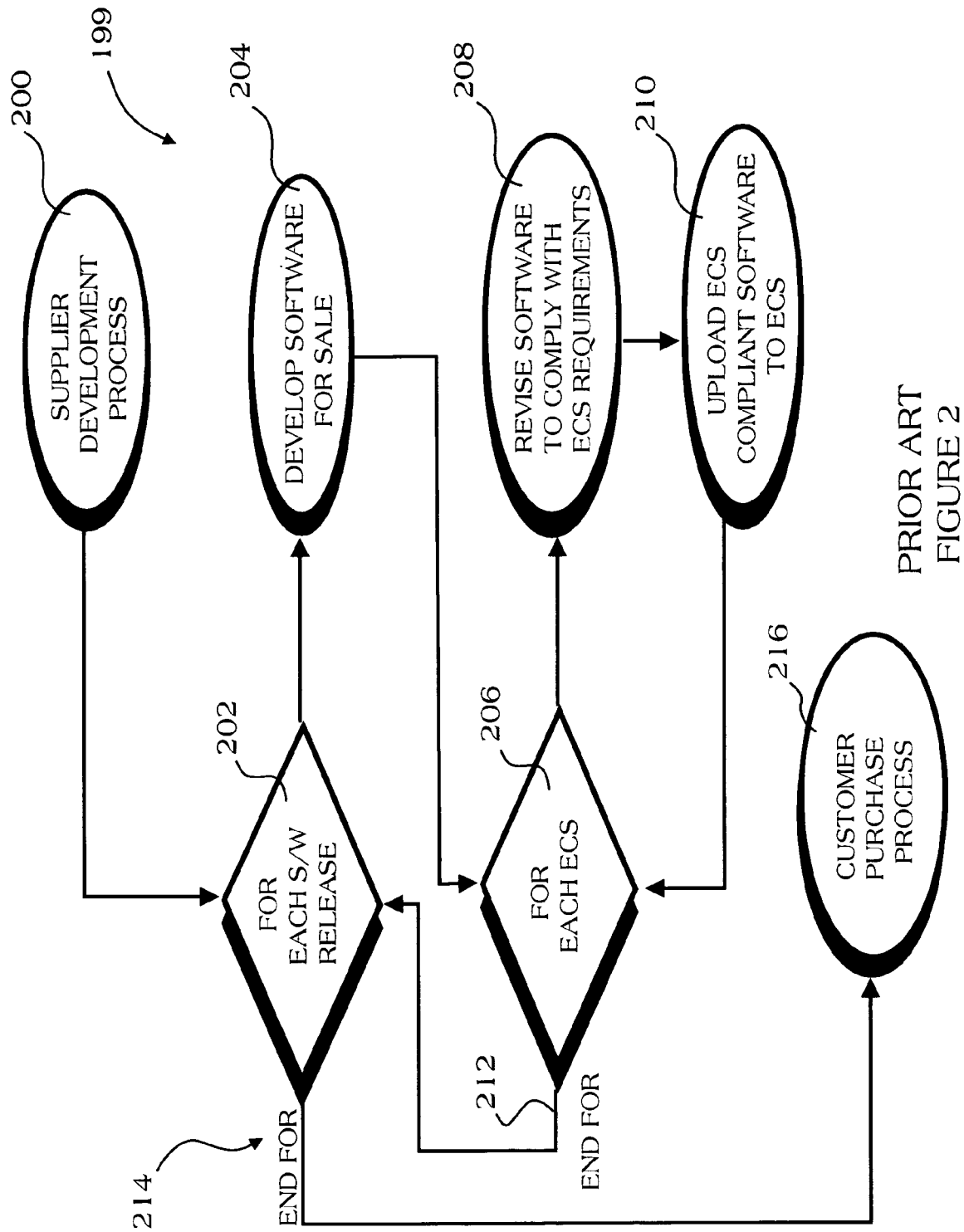
FIG. 2 describes the conventional, prior art supplier posting process for a software supplier to establish and maintain wide area network based software sale.
Figure 3:
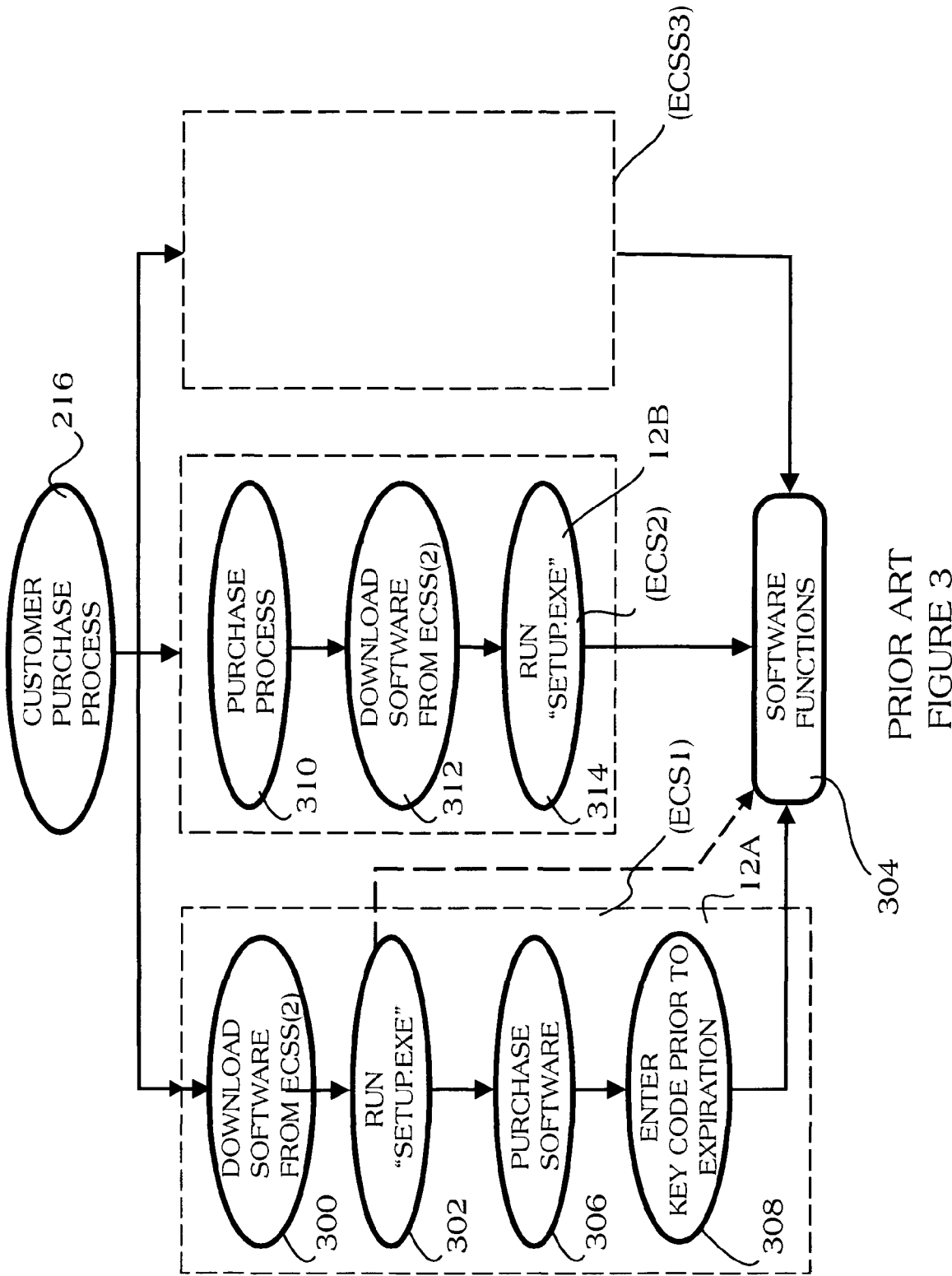
FIG. 3 is a conventional, prior art customer e-commerce software purchase process.
Figure 4:
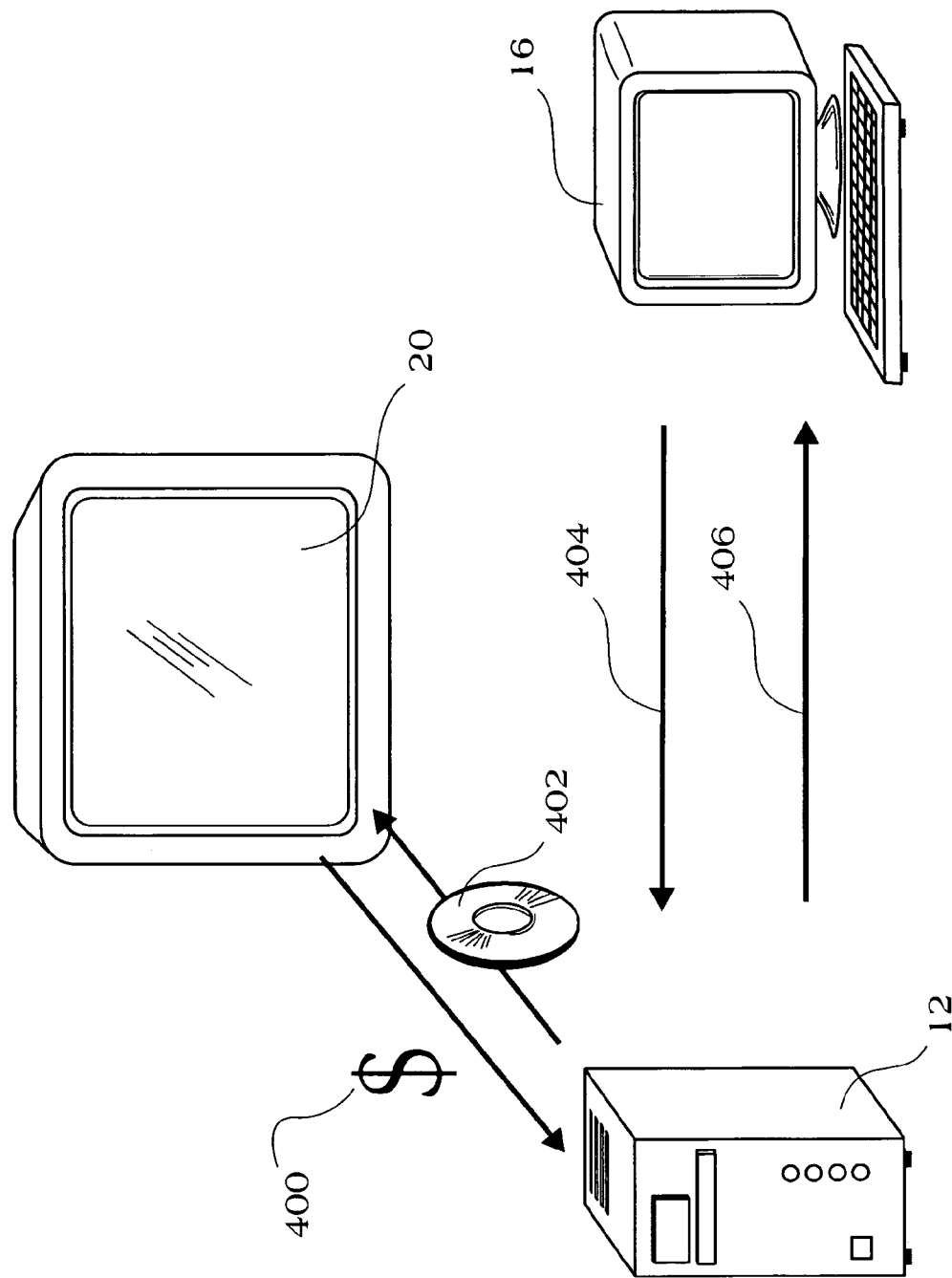
FIG. 4 depicts the conventional, prior art relationships between the customer, the e-commerce service provider, and the software supplier.
Figure 5:
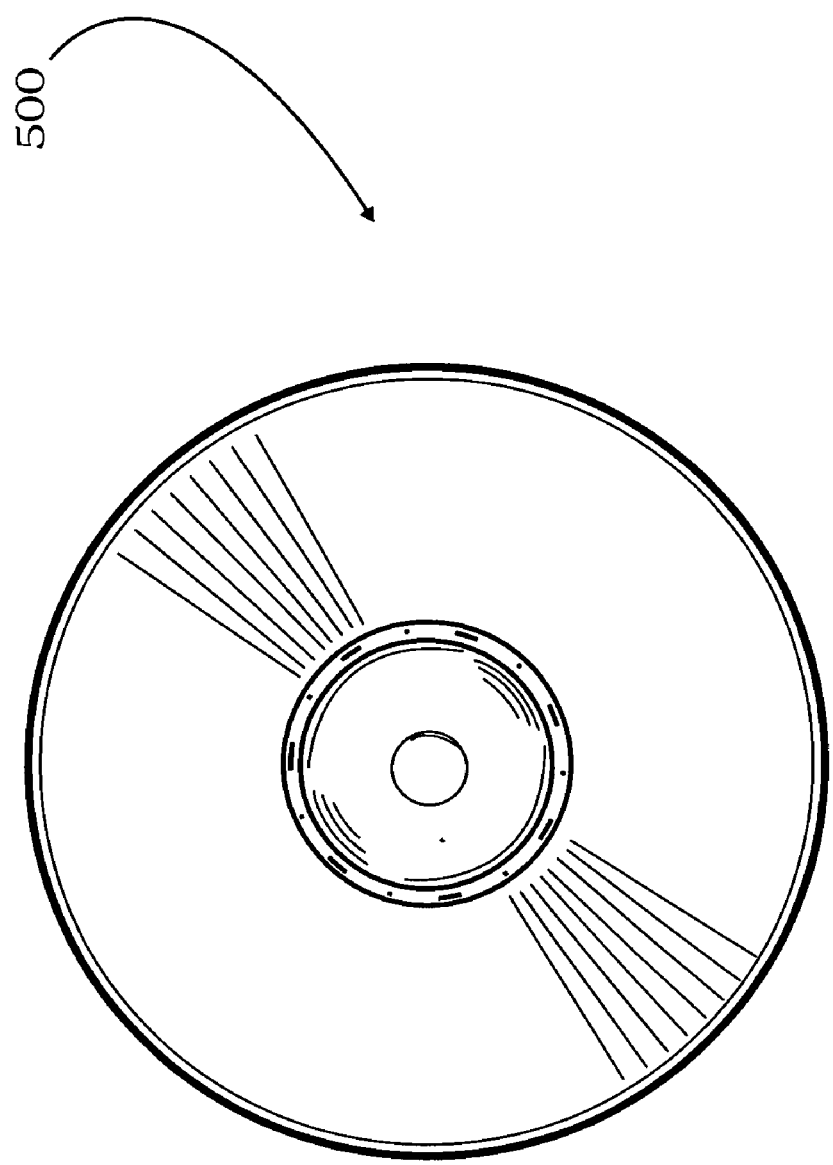
FIG. 5 is a pictorial depiction of the conventional, prior art software application.
Figures 6A, 6B:
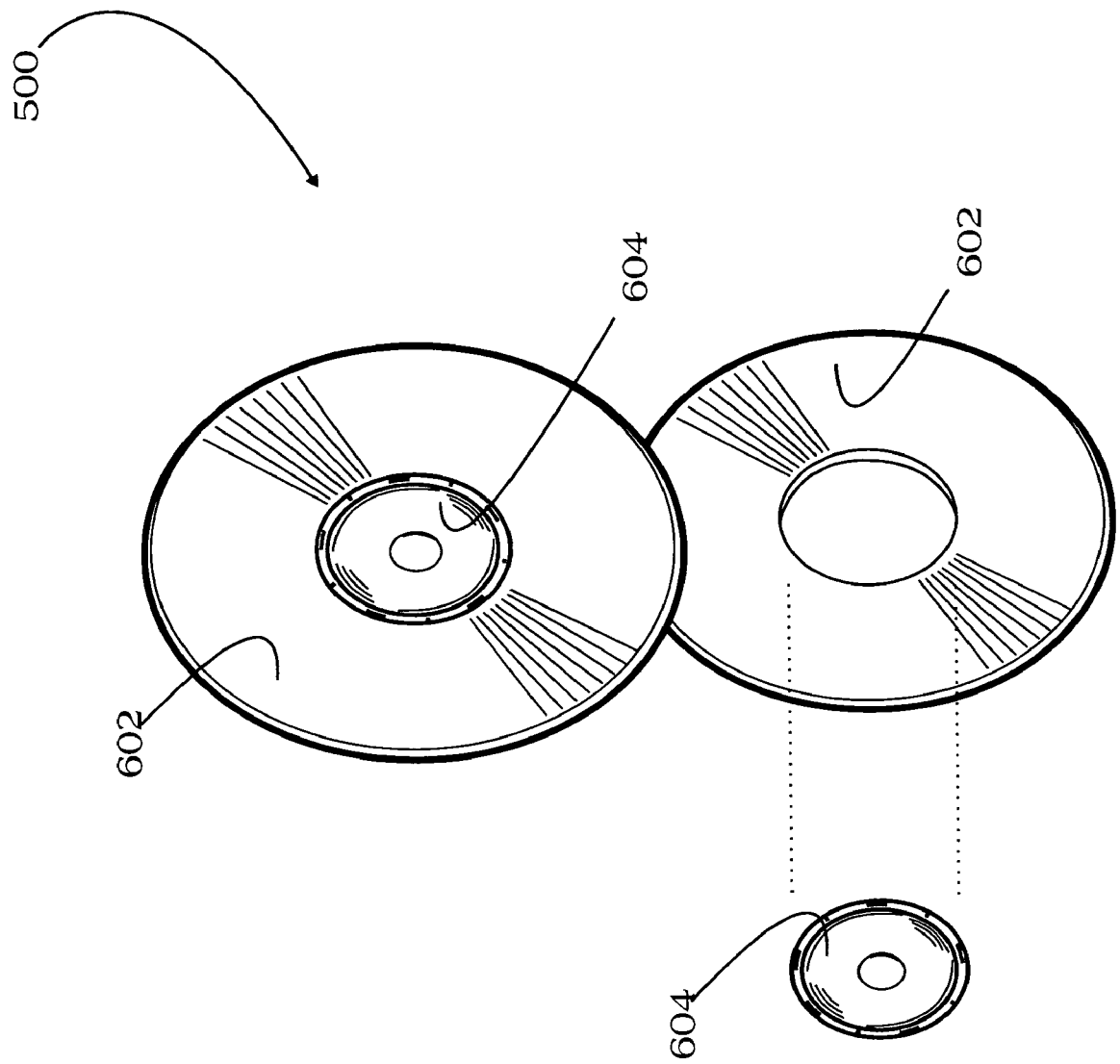
FIGS. 6A and 6B are pictorial depictions of the modularized software application of the present invention.

The present invention can best be understood by initial consideration of FIGS. 6A and 6B. FIGS. 6A and 6B are pictorial depiction's of the modularized software application of the present invention. Under the present invention, the prior software application is actually split up and is now referred to as a modularized software application 600. Modularized software application is composed of two parts, a programmed module 602 and a licensing module 604. Software application 600 will not function without both modules 602 and 604 present. It should be recognized, as is depicted in FIG. 6B, the Licensing Module 604 and Program Module 602 are separable from one another and therefore can be distributed and installed separately. If we know turn to FIG. 7, we can now begin to understand the impact of this change.

Figure 7:
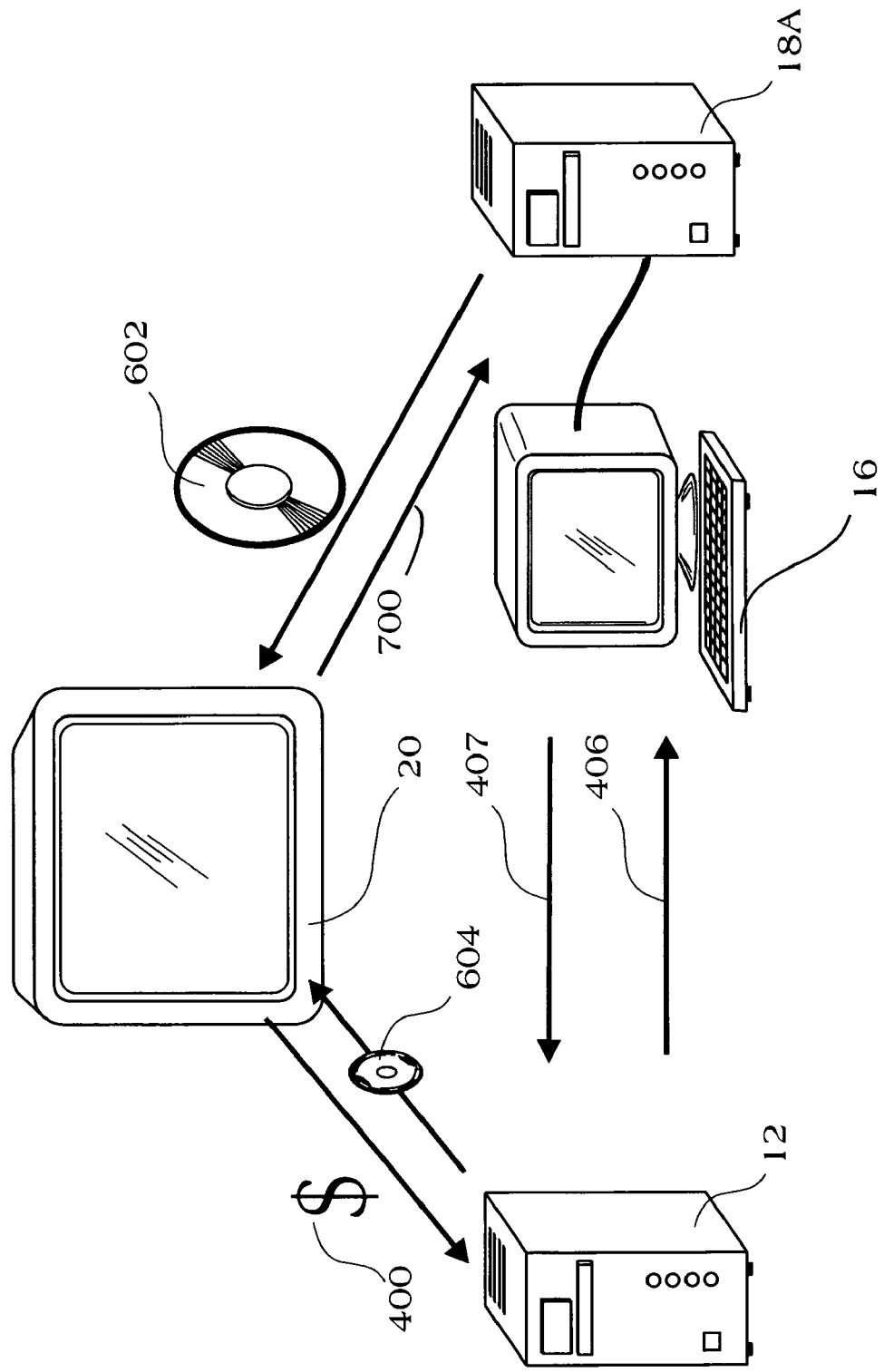
FIG. 7 depicts the relationships between the supplier, the customer, and the e-commerce supplier under the system of the present invention.

FIG. 7 depicts the relationships between the supplier, the customer, and the e-commerce supplier under the system of the present invention. Under the system of the present invention, in purchasing software from the customer terminal 20 makes payment 400 to the e-commerce supplier 12. What is new here, is in exchange for payment the customer receives only the Licensing module 604 after which an automated order is placed 700 directly to the suppliers LAN server 18A in which the LAN server 18A delivers a program module 602 to the customers terminal 20. The benefit of this arrangement is that the e-commerce site 12 need only maintain the relatively small licensing module 604. Furthermore, that module 604, will be formatted once for the e-commerce supplier and will not be changed for changing versions of the program module 602. It is further conceivable that a licensing module 604 from one program module might be compatible with other applications from the same supplier, such that a single module 604 could be compatible with a particular e-commerce supplier 12 that will cover a whole series of different software applications supplied by a particular supplier. If we now turn to FIG. 8, we can examine how the improved customer purchase process 800 will be conducted.

Figure 8:
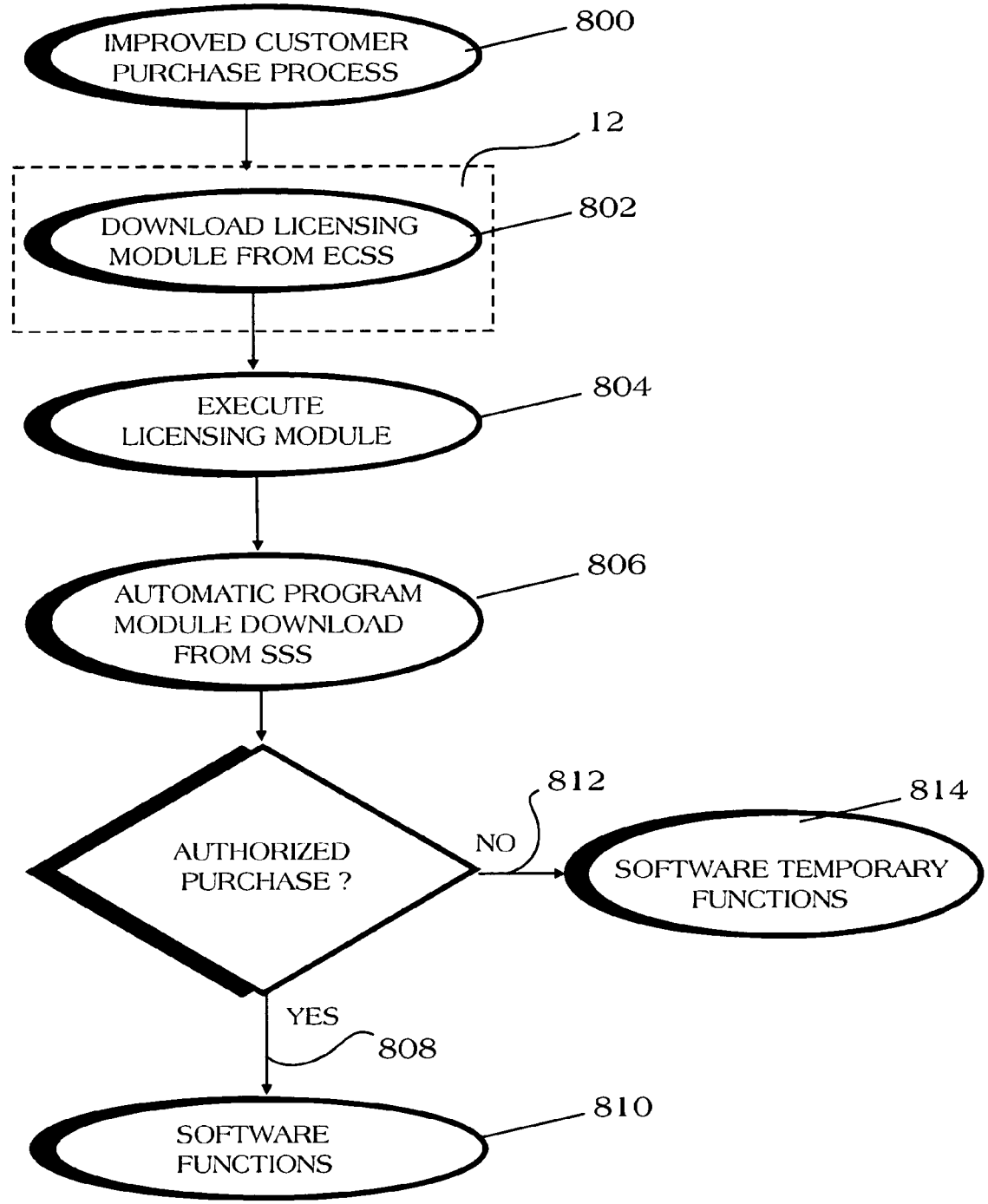
FIG. 8 depicts the improved customer e-commerce software purchase process.

FIG. 8 depicts the improved customer e-commerce software purchase process. Within the e-commerce supplier site 12, the customer will now download only the licensing module 802. This licensing module can either be purchased or simply downloaded, in which this choice will become important. The users must then, within their own terminal execute the licensing module 804 which will trigger the automated program module download 806 from the supplier server 18A (see FIG. 7). If a customer has made an authorized purchase 808, the software will be fully functional 810. If however, the purchase is not authorized 812, the software will only temporarily function 814 which is essentially a try before you buy scenario. However, other "authorization" requirements might be imposed, such as that the customer execute the licensing module software program 804 within 24 hours after its download. This will prevent users from wide scale distribution of these licensing modules and/or from downloading obsolete versions of the program module. If we now turn to FIG. 9, we can see how this improved system layout would appear as it interfaces with the Wide Area Network Conduit 10.

Figure 9:
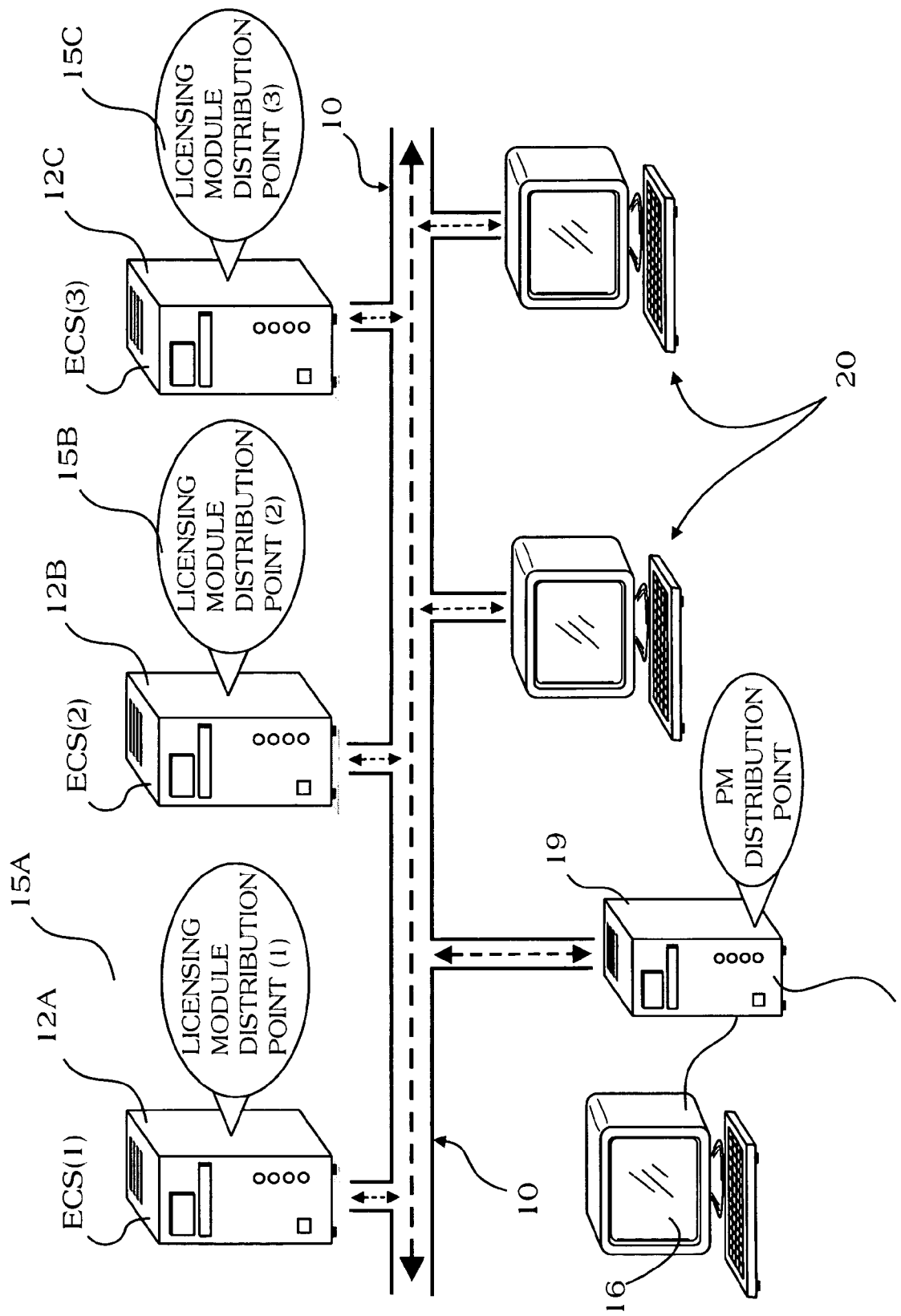
FIG. 9 depicts a preferred arrangement of the participants in the improved e-commerce software sales process.

FIG. 9 depicts a preferred arrangement of the participants in the improved e-commerce software sales process. As can be seen, the e-commerce servers 12 now only maintain the licensing modules at their distribution points 15. In contrast to the prior system where the entire software package was located there. Furthermore, the suppliers' LAN server 18A now has a direct connection to the Wide Area Network Conduit 10, such that it can be the distribution point of the programming module 19. Supplier Terminal 16 might now access the Wide Area Network 10 via the server 18A or even directly on its own depending on the suppliers' desires. The result of this improved arrangement is depicted clearly in the process of FIG. 10.

Figure 10:
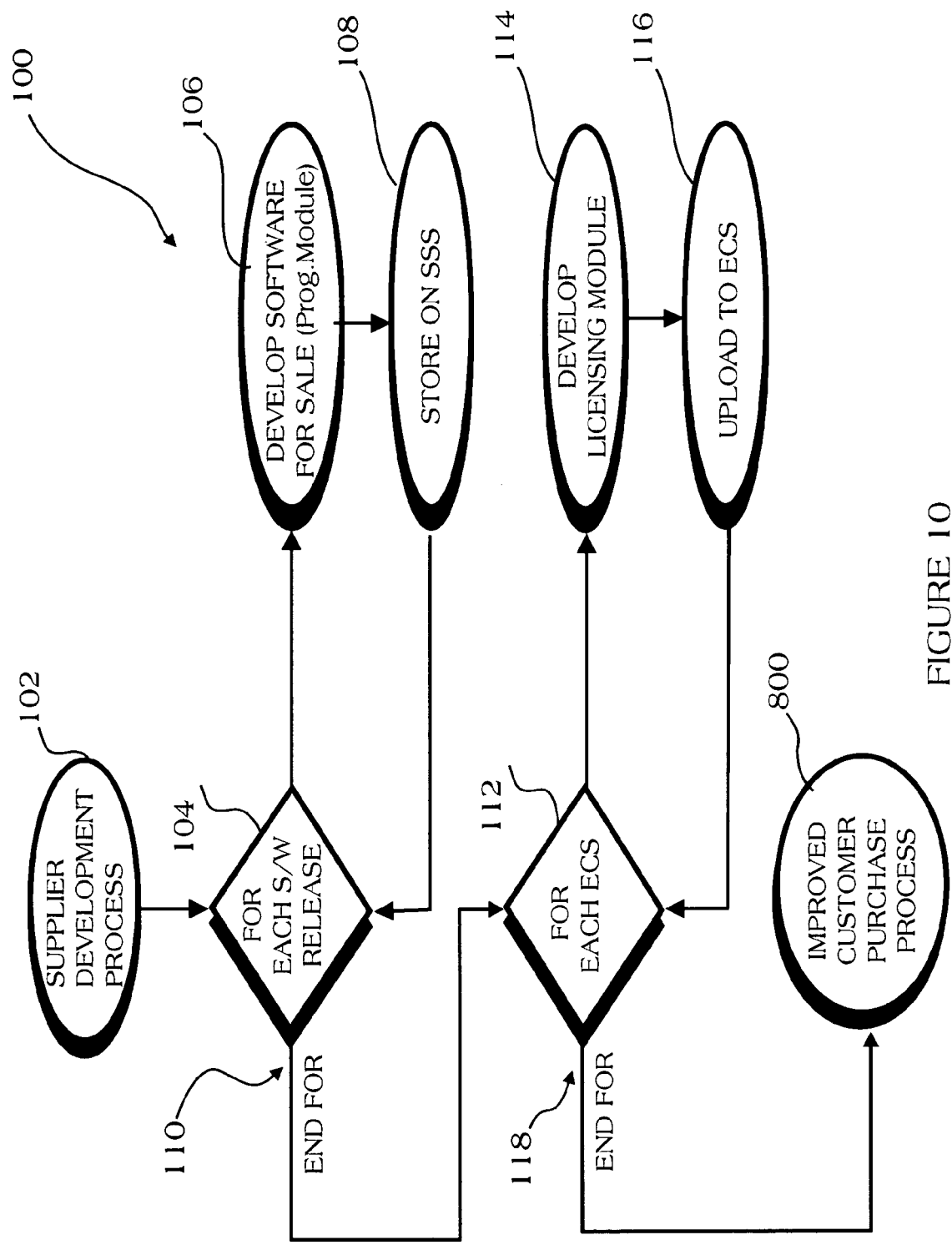
FIG. 10 depicts the improved supplier posting process under the system of the present invention.

FIG. 10 depicts the improved supplier posting process under the system of the present invention. In this improved supplier posting process 100, and upon conclusion of the Supplier Development Process 102, and for each software release 104, the supplier must develop a program module for sale 106. The supplier then stores the program module on their own Wide Area Network Server 108. On completion of this storing process 110, and for each e-commerce supplier 112, the software supplier must develop a licensing module 114 and then upload it to the e-commerce supplier site 116. Again, it should be understood that the licensing module typically need only be revised once for each e-commerce supplier. Therefore, it only needs to be uploaded once to each e-commerce supplier. Furthermore, since the licensing module is much smaller in size than the program module, the upload step 116 will not only be reduced in frequency, but will also be reduced in elapsed time. When the licensing module has been fully uploaded to each e-commerce service supplier 118, then the improved customer purchase process 800 can be commenced.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved system for electronic data sales and distribution over wide area computer networks, said networks comprising a network conduit, at least one e-commerce server computer in communication with said network conduit, and at least one customer terminal computer in communication with said network conduit, each said computer comprising input device, display device, processing device, storage device and device for communicating with said network conduit, the system comprising:
    an e-commerce site for presenting e-commerce functions to each said customer in communication with said e-commerce server computer via said network conduit;
    a licensing module for giving each said customer terminal computer permission to download a program module to said customer terminal computer, said licensing module consisting of an executable software application being executed on each said customer terminal computer engaged in the improved system; and
    a program download site for providing a program module for downloading to each said customer terminal computer responsive to a user request.

2. The system of claim 1, wherein said e-commerce site comprises an executable software application being executed by said processing device of said ecommerce server computer and said program download site comprises an executable software application being executed by a processing device in a program module server computer, said e-commerce server computer and said program module server computer being distinct from one another.

3. The system of claim 2, wherein said e-commerce site further provides each said customer terminal computer with the ability to download said licensing module.

4. The system of claim 3, further comprising a supplier terminal computer in local area network communication with said program module server computer.

5. The system of claim 3, wherein said program module is responsive to output from said licensing module, said program module and said licensing module each comprising executable software applications, wherein output from said licensing module is input to said program module when said program module and said licensing module are executed on the processing device of a single computer.

6. An improved system for software distribution over wide area computer networks, said networks comprising a network conduit, at least one e-commerce server computer in communication with said network conduit, at least one customer terminal computer in communication with said network conduit, and at least one supplier server computer in communication with said network conduit, each said computer comprising at least one programmable computer comprising input device, display device, processing device, storage device and device for communicating with said network conduit, the system comprising:
    an e-commerce site for distributing licensing modules to each said customer terminal computer via said network conduit; and
    a program download site for distributing program modules to each said customer terminal computer via said network conduit
    wherein said licensing modules and said program modules each comprise executable software applications for execution on programmable computers, one said licensing module cooperating with one said program module to function as a whole software application, said distribution of one said program module is responsive to the prior execution of one said licensing module on one said customer terminal computer.

7. The system of claim 6, wherein said e-commerce site comprises an executable software application being executed on said e-commerce server computer.

8. The system of claim 7, wherein said program download site comprises an executable software application being executed on said supplier server computer.

9. The system of claim 6, wherein each said distribution of one said program module commences automatically in response to user input to said executed licensing module through said input device of said customer terminal computer.

10. The system of claim 9, wherein the execution of said program module defines a licensed condition and an unlicensed condition, said program module executes in said licensed or unlicensed condition responsive to output from said licensing module.

11. The system of claim 10, wherein execution of said program module in said unlicensed condition is permitted for a pre-defined period of time, whereby expiration of said pre-defined period of time will prevent said program module from further execution.

12. A method of distributing a software product, via distributors, to users, over a computer network comprising:
    configuring the software product as a program module and a licensing module wherein both the program module and the licensing module are required in order to operate the software product, the licensing module comprising a portion of the software product that is customized for a distributor or a group of distributors and the program module consisting of a portion of the software product that is not customized for the distributor or group of distributors, the program module comprising executable software code,
    storing the configured licensing module at a first software distribution point so that it may be downloaded by a user, and
    storing the program module at a location other than the first software distribution point.

13. The method of claim 12 wherein, subsequent to downloading the licensing module and if certain predetermined conditions are met, the user may download the program module.

14. The method of claim 13 wherein one of the predetermined conditions is payment or promise of payment for the software product.

15. The method of claim 13 wherein one of the predetermined conditions is that the user register the software product.

16. The method of claim 12 further comprising updating the software product by modifying the program module but not modifying the licensing module.

17. The method of claim 13 wherein subsequent to downloading the licensing module the user may run the licensing module.

18. The method of claim 17 wherein running the licensing module automatically downloads the program module.

19. The method of claim 17 wherein the user may run the licensing module only within a predetermined time period after downloading the licensing module.

* * * * *